US008972958B1

(12) United States Patent
Brewer (10) Patent No.: US 8,972,958 B1
(45) Date of Patent: Mar. 3, 2015

(54) MULTISTAGE DEVELOPMENT WORKFLOW FOR GENERATING A CUSTOM INSTRUCTION SET RECONFIGURABLE PROCESSOR

(71) Applicant: Tony Brewer, Plano, TX (US)

(72) Inventor: Tony Brewer, Plano, TX (US)

(73) Assignee: Convey Computer, Richardson, TX (US)

( * ) Notice: Subject to any disclaimer, the term of this patent is extended or adjusted under 35 U.S.C. 154(b) by 0 days.

(21) Appl. No.: 13/658,617

(22) Filed: Oct. 23, 2012

(51) Int. Cl.
*G06F 9/44* (2006.01)

(52) U.S. Cl.
USPC ........... 717/141; 717/143; 717/152; 717/154; 717/159; 717/135

(58) Field of Classification Search
None
See application file for complete search history.

(56) References Cited

U.S. PATENT DOCUMENTS

| 8,327,325 | B2* | 12/2012 | Chung et al. ................. 717/110 |
| 8,458,629 | B2* | 6/2013 | Caldwell et al. ............. 716/103 |
| 2005/0125754 | A1* | 6/2005 | Schubert et al. ................. 716/5 |
| 2005/0193359 | A1* | 9/2005 | Gupta et al. ..................... 716/18 |
| 2009/0064095 | A1 | 3/2009 | Wallach et al. |
| 2010/0036997 | A1 | 2/2010 | Brewer et al. |

OTHER PUBLICATIONS

Nicola Bombieri, "HIFSuite: Tools for HDL Code Conversion andManipulation", Dec. 1, 2009; Accepted Oct. 12, 2010, Hindawi Publishing Corporation.*

Rakhee Keswani, "Computational Model for Re-entrant Multiple Hardware Threads," Electronics and Communication Engineerting, Osmania University, Hyderabad, India, 2002, 87 pages.

Hauck et al., "Sotware Technologies for Reconfigurable Systems," Northwestern University, Dept. of ECE, Technical Report, 1996, 40 pages.

Leidel et al., "CHOMP: A Framework and Instruction Set for Latency Tolerant, Massively multithreaded Processors," Convey Computer Corporation, Richardson, Texas, 12 pages, Nov. 10, 2012.

* cited by examiner

*Primary Examiner* — Lewis A Bullock, Jr.
*Assistant Examiner* — Wynuel Aquino
(74) *Attorney, Agent, or Firm* — Norton Rose Fulbright US LLP (57) ABSTRACT

Systems and systems which implement workflows for providing reconfigurable processor core algorithms operable with associated capabilities using description files, thereby facilitating the development and generation of instruction sets for use with reconfigurable processors, are shown. Embodiments implement a multistage workflow in which program code is parsed into custom instructions and corresponding capability descriptions for generating reconfigurable processor loadable instruction sets. The multistage workflow of embodiments includes a hybrid threading complier operable to compile input program code into custom instructions using a hardware timing agnostic approach. A timing manager of the multistage workflow of embodiments utilizes capabilities information provided in association with the custom instructions generated by the hybrid threading complier to impose hardware timing on the custom instructions. A framework generator and hardware description language complier are also included in the multistage workflow of embodiments.

30 Claims, 3 Drawing Sheets

MULTISTAGE DEVELOPMENT WORKFLOW FOR GENERATING A CUSTOM INSTRUCTION SET RECONFIGURABLE PROCESSOR

CROSS-REFERENCE TO RELATED APPLICATIONS

The present application is related to copending and commonly assigned U.S. patent application Ser. No. 11/847,169 entitled "Compiler for Generating an Executable Comprising Instructions for a Plurality of Different Instruction Sets," filed Aug. 29, 2007, Ser. No. 11/969,792 entitled "Microprocessor Architecture Having Alternative Memory Access Paths," filed Jan. 4, 2008, and Ser. No. 12/186,372 entitled "Multiple Data Channel Memory Module Architecture," filed Aug. 5, 2008, the disclosures of which are hereby incorporated herein by reference.

TECHNICAL FIELD

The invention relates generally to reconfigurable processor based computing and, more particularly, to workflows for providing reconfigurable processor core algorithms and associated external capabilities using description files.

BACKGROUND OF THE INVENTION

The popularity of computing systems continues to grow and the demand for improved processing architectures thus likewise continues to grow. Ever-increasing desires for improved computing performance/efficiency has led to various improved processor architectures. For example, multi-core processors are becoming more prevalent in the computing industry and are being used in various computing devices, such as servers, personal computers (PCs), laptop computers, personal digital assistants (PDAs), wireless telephones, and so on.

In the past, processors such as central processing units (CPUs) featured a single execution unit to process instructions of a program. More recently, computer systems are being developed with multiple processors in an attempt to improve the computing performance of the system. In some instances, multiple independent processors may be implemented in a system. In other instances, a multi-core architecture may be employed, in which multiple processor cores are amassed on a single integrated silicon die. Each of the multiple processors (e.g., processor cores) can simultaneously execute program instructions. This parallel operation of the multiple processors can improve performance of a variety of applications.

Various devices are known that are reconfigurable. Examples of such reconfigurable devices include field-programmable gate arrays (FPGAs). A field-programmable gate array (FPGA) is a well-known type of semiconductor device containing programmable logic components called "logic blocks", and programmable interconnects. Logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memories. A hierarchy of programmable interconnects allows logic blocks to be interconnected as desired by a system designer. Logic blocks and interconnects can be programmed by the customer/designer, after the FPGA is manufactured, to implement any logical function, hence the name "field-programmable."

Configurations of the foregoing FPGAs may be utilized to provide reconfigurable processors, wherein binary files for implementing gate netlists designed to configure the FPGA for particular reconfigurable processor operation are loaded onto the FPGA, in the form of a loadable instruction set, in order to provide it with a desired operational "personality" (e.g., an instruction set optimized for providing particular operations, such as floating point calculations, graphics rendering, cryptographic functions, etc.). For example, one or more FPGA may be provided in association with a CPU (e.g., a fixed instruction set host processor, such as a processor implementing a x86 instruction set) to provide a heterogeneous co-processor configuration, whereby the FPGA may be dynamically configured to provide co-processor functionality optimized with respect to a current operation or use of the host processor. Such dynamically reconfigurable heterogeneous co-processor implementations provide advantages in functionality and performance.

However, creating the instruction sets to implement FPGA personalities for providing desired operations has historically been challenging. In particular, the hardware level implementation of the reconfigurable aspect of such FPGAs has generally required uniquely talented individuals, having skill sets and detailed knowledge of hardware configuration and software coding. Accordingly, the development of instruction sets for use with respect to reconfigurable processors has been somewhat limited and has generally required appreciable development time.

BRIEF SUMMARY OF THE INVENTION

The present invention is directed to systems and methods which implement workflows for providing reconfigurable processor core algorithms operable with associated external capabilities using description files, thereby facilitating the development and generation of instruction sets for use with reconfigurable processors. Embodiments of the invention implement a multistage workflow in which program code is parsed into custom instructions and corresponding capability descriptions for generating reconfigurable processor loadable instruction sets. The multistage workflow and associated description files (e.g., including a custom instructions description file and a framework capabilities description file) facilitates the use of standard programming languages (e.g., C++), using suitable pragmas, and personnel without specialized hardware level skills to develop (including design, debug, analyze, and/or generate) instruction sets for reconfigurable processors which are optimized for any of a number of processor functions. Moreover, the multistage workflow of embodiments is adapted to facilitate relatively rapid performance analysis and iterative optimization, such as through simulation using an instruction set framework generated by the multistage workflow. Embodiments of the multistage workflow implement one or more flags to facilitate the controlled use or inclusion of certain features with respect to particular stages of the development of instruction sets (e.g., a debug flag and/or an instrumentation flag to implement control of debugging and/or instrumentation at a hardware description language compiler stage).

In operation according to embodiments of the invention, a compiler compiles applications with embedded pragmas into host processor code (e.g., x86 processor code) and coprocessor hardware translation (e.g., custom instructions to be implemented on a field programmable gate array or other reconfigurable processor operable as a coprocessor). For example, the hardware translation provided by the complier converts the code identified by pragmas to a set of hardware states that are executed by hardware state machines. Timing management is applied, according to embodiments of the invention, to code segments targeted for the coprocessor to break the code segments into code that can be performed as a single state machine state. A common framework for the compressor is defined, according to embodiments, that includes the host interface, hardware state machines, and interface to memory. The common framework is generated for the current reconfigurable processor personality (e.g., instruction set optimized for providing particular operations) to accommodate multiple modules (e.g., functional blocks of custom instructions operable upon the reconfigurable processor), threading (e.g., hardware threading wherein a hardware state machine is time shared across many threads, such as to accommodate latency to memory, wherein if the code for a thread takes too many clocks to execute the thread may be broken into multiple code segments such that each code segment would be handled on a separate hardware state machine), call/return (e.g., using threads between modules), thread local, thread private, thread shared, global variables, staging variables, private variables, etc.

A multistage development workflow of embodiments of the invention comprises a description file complier stage accepting input of program code in a standard programming language, providing parsing of the program code into custom instructions for execution by a reconfigurable processor, and providing output of a custom instructions description file and a framework capabilities description file adapted for further processing by subsequent stages of the workflow. The hybrid threading complier of embodiments is adapted to generate the custom instructions in a timing agnostic process, such as through the use of a constraint set, whereby the hybrid threading complier is not burdened with addressing hardware timing issues of the reconfigurable processor. The custom instructions provided by the hybrid threading compiler preferably comprise a set of instructions, derived from the input program code, that are operable together to implement the reconfigurable processor core algorithm defined by the input program code. The capability descriptions provided by the hybrid threading compiler preferably comprise information regarding the capabilities (e.g., variables, modules, and/or other resources) utilized by corresponding custom instructions.

The multistage development workflow of embodiments further comprises a timing management stage accepting input of the foregoing custom instructions description file and framework capabilities description file, analyzes the custom instructions with respect to hardware timing (e.g., using a timing constraint database), and provides output of the custom instructions description file and the framework capabilities description file adapted for implementing appropriate timing in the reconfigurable processor. For example, the timing manager may break custom instructions into a plurality of clock cycle blocks, insert staging registers in appropriate positions in the custom instructions, etc. in order to make hardware timing requirements of the reconfigurable processor. Correspondingly, the timing manager may insert information regarding the added staging registers in the framework capabilities description file.

The multistage development workflow of embodiments further comprises a framework generator stage accepting input of the foregoing timing adapted description files, generating the connection information to facilitate proper execution of the custom instructions and their interaction with reconfigurable processor capabilities, and providing a framework comprising one or more routines that call the custom instructions and implements the appropriate reconfigurable processor capabilities. The framework preferably comprises an executable description of the reconfigurable processor core algorithm, adapted to accommodate hardware timing, and interfaces to appropriate reconfigurable processor capabilities.

In operation according to embodiments of the invention, the foregoing framework may be utilized in simulating operation of the reconfigurable processor (e.g., to analyze performance of the core algorithm implementation, to optimize the custom instructions, etc.) and/or to generate an executable for loading in a reconfigurable processor for implementing the instruction set. Accordingly, the framework generated according to embodiments of the invention may be provided to a simulator and/or a hardware description language complier.

A hardware description language complier of the multistage development workflow of embodiments accepts input of the framework and compiles the program code therein into a hardware description language suitable for generating bitstream files used in configuring reconfigurable processors with an instruction set. The hardware description language compiler of embodiments is responsive to one or more flags to control certain features (e.g., debug flags and/or instrumentation flags such as may be utilized in the development of instruction sets).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
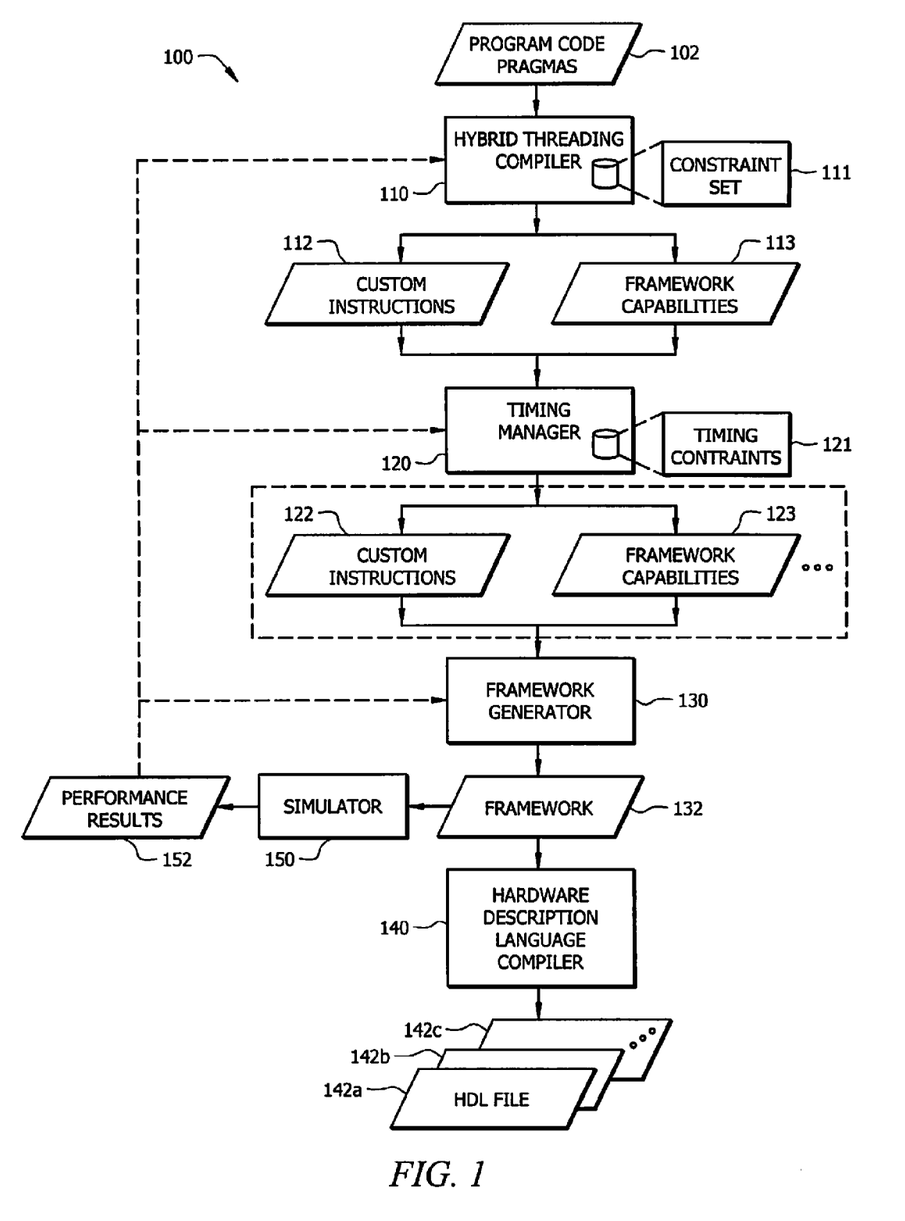
FIG. 1 shows a multistage development workflow according to embodiments of the invention.

FIG. 1 shows multistage development workflow 100 of embodiments of the invention. Multistage development workflow 100 of the illustrated embodiment includes 4 stages, including a description file compiler stage provided by hybrid threading compiler 110, a timing adaptation stage provided by timing manager 120, a framework generation stage provided by framework generator 130, and a hardware description language compiler stage provided by hardware description language compiler 140, cooperative to provide reconfigurable processor instruction set development using description files herein. Moreover, multistage development workflow 100 of the embodiment shown in FIG. 1 is adapted to facilitate relatively rapid performance analysis and iterative optimization of custom instruction sets through simulation using simulator 150.

It should be appreciated that the foregoing functional blocks of the illustrated multistage development workflow (i.e., hybrid threading compiler 110, timing manager 120, framework generator 130, hardware description language compiler 140, and simulator 150) may be implemented as one or more processor-based systems operable under control of a corresponding instruction set defining operation as described herein. For example, one or more of the functional blocks of FIG. 1 may be implemented in software as code segments to perform the described tasks. The program or code segments can be stored in a computer readable medium. Examples of such a computer readable medium include an electronic circuit, a semiconductor memory device, a read only memory (ROM), a flash memory, a magnetic disk, an optical disk, etc. The code segments may additionally or alternatively be downloaded via computer networks, such as the Internet, an intranet, etc.

Figure 2:
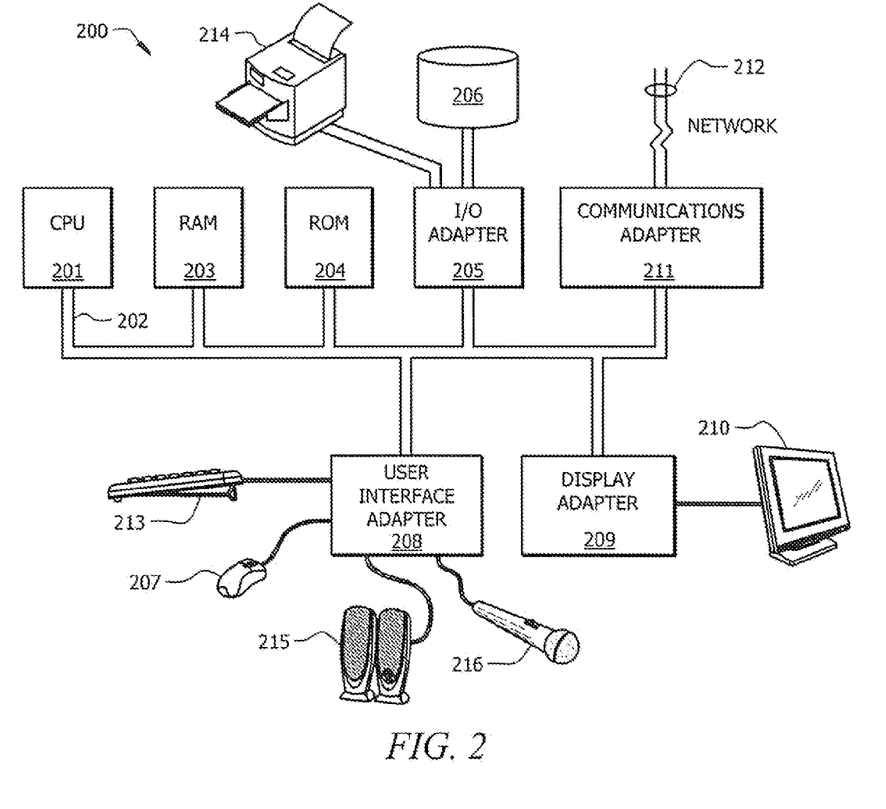
FIG. 2 shows a computer system as may be adapted to provide the functional blocks of a multistage development workflow of embodiments of the invention.

FIG. 2 illustrates computer system 200 as may be adapted with the aforementioned code segments to provide the functional blocks of a multistage development workflow of embodiments herein. Computer system 200 of the illustrated embodiment includes central processing unit (CPU) 201 coupled to system bus 202. CPU 201 may be any general purpose CPU, such as a processor from the CORE line of processors from Intel Corporation. However, the present invention is not restricted by the architecture of CPU 201 and thus embodiments may utilize any configuration of CPU 201 supporting operation according to the concepts described herein. Bus 202 is coupled to random access memory (RAM) 203, which may be static random access memory (SRAM), dynamic random access memory (DRAM), synchronous dynamic random access memory (SDRAM), non-volatile random access memory (NVRAM), and/or any other suitable configuration of computer readable memory. Read only memory (ROM) 204 is also coupled to bus 202, which may comprise programmable read only memory (PROM), erasable programmable read only memory (EPROM), electrically erasable programmable read only memory (EEPROM), and/or any other suitable configuration of computer readable memory. RAM 203 and ROM 204 hold user and system data and programs as is well known in the art.

Bus 202 of the illustrated embodiment of computer system 200 is also coupled to input/output (I/O) controller 205, communications adapter 211, user interface 208, and display adaptor 209. I/O adapter 205 of the illustrated embodiment connects storage devices 206, such as may comprise one or more forms of bulk storage (e.g., magnetic media, optical media, solid state memory, etc.), to the computer system. I/O adapter 205 of the illustrated embodiment is also connected to printer 214, which would allow the system to output copies of information such as documents, reports, code listings, etc. Communications adaptor 211 is adapted to couple computer system 200 of the illustrated embodiment to network 212, which may be one or more of the public switched telephone network (PSTN), a local area network (LAN), a metropolitan area network (MAN), a wide-area network (WAN), the Internet, an intranet, an extranet, etc. User interface 208 couples user input devices, such as keyboard 213, pointing device 207, and microphone 216, to computer system 200. User interface 208 also provides output to a user, such as output of sound via speaker(s) 215. Display adaptor 209 is driven by CPU 201 to control the display on display device 210.

Figure 3:
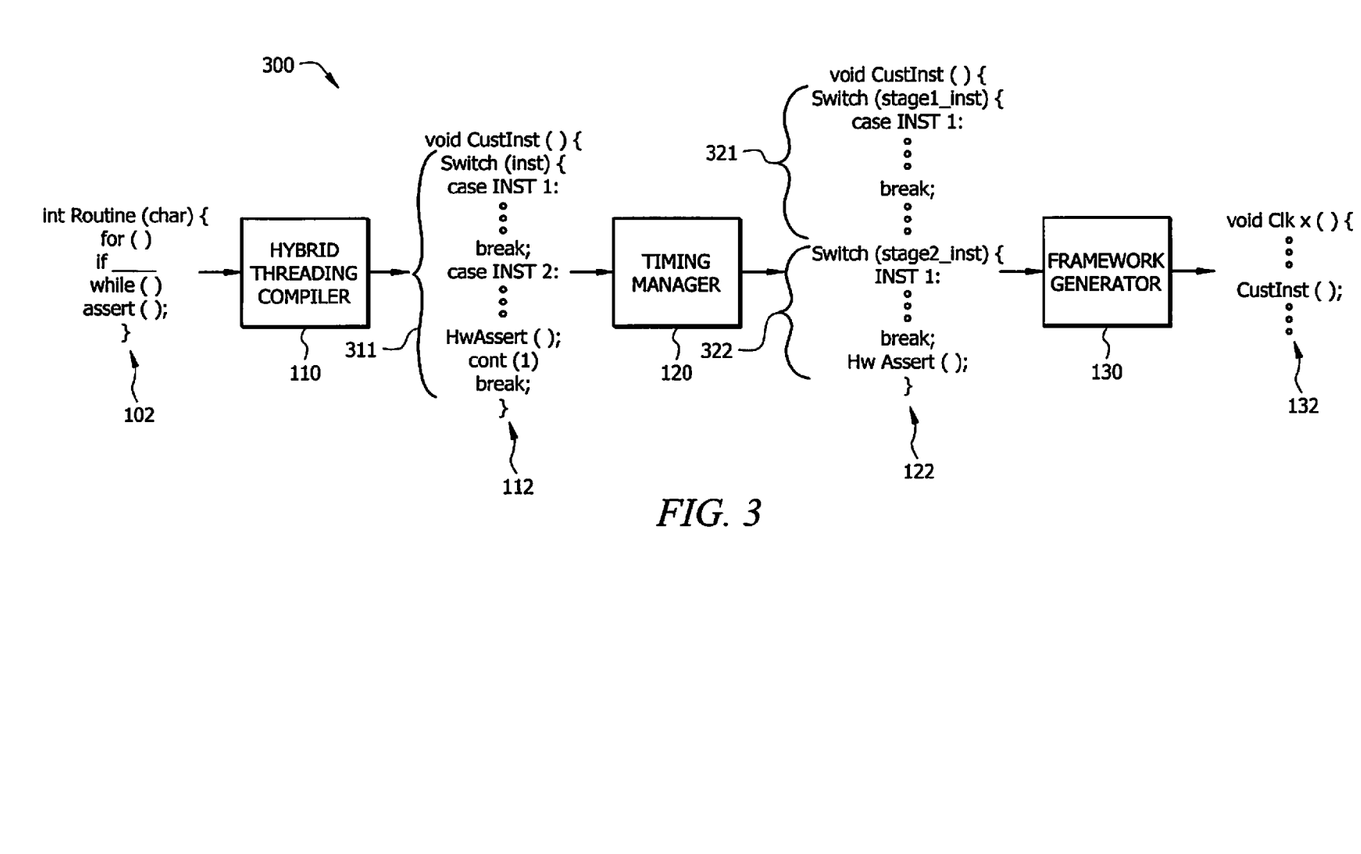
FIG. 3 shows pseudo code generated by operation of functional blocks of a multistage development workflow of embodiments of the invention.

Referring again to FIG. 1, in operation of multistage development workflow 100 of embodiments, program code 102 for implementing a core algorithm as a reconfigurable processor instruction set is provided to hybrid threading complier 110 of a description file compiler stage of the workflow. Program code 102 provided to hybrid threading complier 110 of embodiments comprises a standard programming language (e.g., C++) to accommodate the use of personnel without specialized hardware level skills to develop instruction sets for reconfigurable processors using the workflow herein. For example, program code 102 may utilize standard constructs, such as "for", "if", "while", case statements, switch statements, etc. as represented by the pseudo code shown in FIG. 3, to facilitate programming of reconfigurable processor core algorithms using software programming skill sets.

Program code 102 may include various pragmas in addition to the aforementioned standard programming language constructs, such as to provide information for downstream optimizations etc. For example, a compiler of multistage development workflow 100 may be adapted to generate an executable comprising instructions for a plurality of different processor instruction sets (e.g., a heterogeneous multi-processor configuration), such as shown and described in the above referenced patent application entitled "Compiler for Generating an Executable Comprising Instructions for a Plurality of Different Instruction Sets." Accordingly, pragma statements may be included in the program code to indicate sections of the program code to be run on a co-processor of a multi-processor configuration.

Hybrid threading compiler 110 of embodiments operates to parse statements contained in program code 102 into custom instructions and corresponding capability descriptions for use in generating reconfigurable processor loadable instruction sets herein. Accordingly, hybrid threading complier 110 of the embodiment illustrated in FIG. 1 accepts input of program code 102, provides parsing of the program code statements into custom instructions for execution by a reconfigurable processor, and provides output of custom instructions description file 112 and framework capabilities description file 113. For example, hybrid threading complier 110 of embodiments analyzes the statements of program code 102 that are to be executed by the reconfigurable processor and aggregates those statements into custom instructions, wherein such custom instructions may comprise the individual case entries within switch statements, as represented in the pseudo code of FIG. 3, for implementing the instructions in the hardware of a reconfigurable processor. The custom instructions are output by hybrid threading complier of the illustrated embodiment in custom instruction description file 112. Hybrid threading complier 110 is preferably adapted to identify (e.g., through analysis of the input program code) the reconfigurable processor capabilities (e.g., variables accessed, modules called, etc.) that the custom instructions utilize. Information regarding the reconfigurable processor capabilities utilized by the custom instructions is output by hybrid threading complier 110 of the illustrated embodiment in framework capabilities description file 113. It should be appreciated that the information included in framework capabilities description file 113 of embodiments may include such information as variable type, external module identification, port identification, support for modules with multi-threaded execution with custom instructions, support for C style typedefs, structures, and unions, support for thread private, thread shared, global variables, and pipeline staging variables, support for custom instruction memory read and write operations, support for modules to interact including remote module thread creation, message passing, and global variable access, etc.

Hybrid threading complier 110 of embodiments is adapted to generate the custom instructions in a timing agnostic process, whereby hybrid threading compiler 110 compiles code independent of the reconfigurable processor hardware latency requirements. Hybrid threading complier 110 of embodiments parses input program code statements into a switch statement and case entries, assuming the switch statement and case entries are accomplished in a single reconfigurable processor clock cycle, and is thus not burdened with addressing hardware timing issues of the reconfigurable processor. The timing agnosticity of hybrid threading complier 110 according to embodiments alleviates the burden of the compiler associated with identifying and resolving hardware timing implementation, thereby facilitating higher performance compiler operation and/or the use of less computing resources by the compiler. Moreover, such timing agnosticity facilitates a backend configuration of the multistage development workflow in which the compiled results may be applied to different uses (e.g., different reconfigurable processor configurations, different clock speeds, etc.) that would require different timing constraints. Appropriate sets of timing constraints (discussed below), implemented in adapting the description files for hardware timing, may be utilized in generating the reconfigurable processor instruction sets for such different uses from a same instance of the custom instruction description file.

In order to facilitate the timing agnostic operation of hybrid threading complier 110 of embodiments, constraint set 111 (e.g., as may be stored in a database of, or accessible to, hybrid threading complier 110) is provided setting forth one or more constraint with respect to the custom instructions. The constraints of constraint set 111 comprise constraints to be imposed upon hybrid threading complier 110 to facilitate its operation based upon an assumption that the performance of a custom instruction not exceeding any such constraint, irrespective of the number of input program code statements aggregated into the custom instruction, may be completed in a single clock cycle of the reconfigurable processor. Constraint set 111 of embodiments may establish custom instruction constraints based upon physical limitations imposed by framework generator 130 to thereby prevent a terminal conflict resulting from the foregoing single clock cycle assumption. For example, memory access constraints (e.g., one memory access per custom instruction), arrayed variable access constraints (e.g., arrayed variables can have a single access per custom instruction), messaging interface constraints (e.g., a single message can be received and sent using any given messaging interface), etc. may be imposed. As a custom instruction is being generated, hybrid threading complier 110 of embodiments analyzes the capabilities implicated by the custom instruction and, when it is determined that any constraint of constraint set 111 is met or would be exceeded, it may be determined that the custom instruction cannot include further input program code statements and thus generation of another custom instruction of the reconfigurable processor instruction set is begun.

As an example of the use of the foregoing constraints, assume that the flexibility afforded by framework generator 140 in providing reconfigurable processor capabilities for the custom instructions provides a single port to memory, and thus a constraint of constraint set 111 restricts a custom instruction to a single external memory access in any single clock cycle. As input program code statements are parsed by hybrid threading complier 110 to generate a custom instruction, reconfigurable processor capability utilization is preferably analyzed to identify external memory access (and information regarding the capabilities utilized by the custom instructions is preferably included in framework capabilities description file 113 for subsequent use). When it is determined that a second external memory access would be implicated by the input program code statements being parsed into a single custom instruction, generation of the current custom instruction is completed and a subsequent custom instruction is generated to implement the input program code statement including the second external memory access.

As another example of the use of the foregoing constraints, assume that the flexibility afforded by framework generator 140 in providing reconfigurable processor capabilities for the custom instructions provides for access to all shared variables, all private variables, and all global variables, the reconfigurable processor accommodates access of only one element of a variable array (whether shared, private, or global) in any single clock cycle. As input program code statements are parsed by hybrid threading complier 110 to generate a custom instruction, reconfigurable processor capability utilization is preferably analyzed to identify variable array access. When it is determined that access to a second element of a variable array would be implicated by the input program code statements being parsed into a single custom instruction, generation of the current custom instruction is completed and a subsequent custom instruction is generated to implement the input program code instruction including the second variable array element access.

It can be appreciated from the foregoing that the custom instructions provided by hybrid threading compiler 110 of embodiments comprises a set of custom instructions, derived from the input program code, that are operable together to implement the reconfigurable processor core algorithm defined by the input program code. The capability descriptions output by hybrid threading compiler 110 of embodiments comprise information regarding the capabilities (e.g., variables, modules, and/or other resources) utilized by the corresponding custom instructions.

In operation according to the illustrated embodiment, the description files output by hybrid threading complier 110 (e.g., custom instructions description file 112 and framework capabilities description file 113) are provided to timing manager 120 for processing to adapt the custom instructions for reconfigurable processor hardware timing. Accordingly, timing manager 120 of embodiments accepts input of custom instructions description file 112 and framework capabilities description file 113, analyzes the custom instructions with respect to hardware timing, and provides output of custom instructions description file 122 and framework capabilities description file 123 adapted for implementing appropriate timing in the reconfigurable processor. For example, timing manager 120 may analyze each of the individual case statements of the custom instructions to determine how many physical clock cycles to spread those instructions over in order to make the target timing requirements. Timing manager 120 of embodiments references framework capabilities description file 113 when analyzing the custom instructions of custom instructions description file 112, such as information regarding the type of variable, the capabilities implicated, etc., to determine hardware timing for the custom instructions.

In order to facilitate the custom instruction timing adaptation operation of timing manager 120 of embodiments, timing constraints 121 (e.g., as may be stored in a database of, or accessible to, timing manager 120) is provided setting forth one or more constraint with respect to the hardware timing of the reconfigurable processor. Timing constraints 121 of embodiments may establish timing constraints based upon physical timing of reconfigurable processor capabilities. For example, timing constraints 121 may provide information regarding the latency for implementing each of a plurality of capabilities, such as the latency for performing all operations (e.g., add, subtract, logical, etc.), the latency for performing variable access, etc. Using the timing constraint analysis, timing manager 120 of embodiments operates to adapt the custom instructions for reconfigurable processor hardware timing. For example, timing manager 120 may operate to spread an instruction over multiple clock cycles in order to make the target timing requirements, as represented by instruction 311 being broken into pipeline stages 321 and 322 in the pseudo code of FIG. 3, thereby providing timing adapted custom instructions description file 122. Additionally or alternatively, timing manager 120 may insert staging registers in appropriate positions in the custom instructions in providing timing adapted custom instructions description file 122, such as to accommodate the foregoing spreading of instructions over a plurality of clock cycles. Correspondingly, timing manager 120 may insert information regarding the added staging registers in the framework capabilities description file to thereby provide timing adapted framework capabilities description file 123.

In operation according to the illustrated embodiment, the timing adapted description files output by timing manager 120 (e.g., timing adapted custom instructions description file 122 and timing adapted framework capabilities description file 123) are provided to framework generator 130 for processing to generate one or more modules comprising routines that call the custom instructions and implement the appropriate reconfigurable processor capabilities. Accordingly, framework generator 130 of embodiments accepts input of custom instructions description file 122 and framework capabilities description file 123, generates the connection information to facilitate proper execution of the custom instructions and their interaction with reconfigurable processor capabilities, and provides a framework comprising one or more routines that call the custom instructions and implements the appropriate reconfigurable processor capabilities. It should be appreciated that a plurality of modules may be implemented using multistage development workflow 100 of embodiments. Thus, multiple instances of custom instruction description file 122 and framework capabilities description file 123, as provided by hybrid threading compiler 110 and timing manager 120 with respect to the input program code statements of the various modules, may be provided to framework generator 130 for use in generating the framework. Operation of framework generator 130 according to embodiments herein adds the code for setting up the interfaces (e.g., memory interfaces, module interfaces, etc.) used by the custom instructions of custom instructions 122.

The generated framework is output by framework generator 130 of the illustrated embodiment as framework file 132. Framework file 132 preferably comprises an executable description of the reconfigurable processor core algorithm, adapted to accommodate hardware timing, and interfaces to appropriate reconfigurable processor capabilities as represented by the pseudo code of FIG. 3.

Generating the framework by framework generator 130 of embodiments comprises analyzing the capabilities implicated by the custom instructions and generating one or more routine that provides all those capabilities (e.g., all the variables, interfaces to memory, interfaces to other modules, etc.) in the form of an executable module. Frameworks generated by framework generator 130 according to embodiments of the invention implement threads as a means to perform the desired computational operations, wherein the threads execute the aforementioned custom instructions. In accordance with frameworks of embodiments herein, a single custom instruction is executed for an individual thread at any one point in time, whereas a module executes a custom instruction requiring multiple clock cycles to execute. As previously mentioned, hardware timing constraints are met by spreading a custom instruction across multiple clock cycles according to embodiments herein. A thread, from a set of threads belonging to a module, is able begin execution every clock cycle within each module. Frameworks of embodiments provide a reconfigurable processor personality comprising multiple modules, wherein the multiple modules interact through well defined module interfaces (e.g., module interfaces comprising thread call/return, message passing, global variable references, etc.). The aforementioned framework capabilities description files preferably specify the module interfaces as well as the resources required within each module (e.g., thread load and thread private variables).

Framework generator 130 of embodiments provides a framework comprising a complete, executable SystemC model of the reconfigurable processor, such as may be run using the C++ compiler of the SystemC model. The model generated by the framework generator of embodiments is clock cycle accurate with respect to the reconfigurable processor implementation. Accordingly, framework file 132 may be provided to hardware description language compiler 140 to generate the actual hardware description language (e.g., VERILOG HDL) of that module. However, simulation of the reconfigurable processor implementing the custom instruction set, as provided in the generated framework, may be used to optimize the custom instruction set or to otherwise improve the performance thereof.

Accordingly, the illustrated embodiment of multistage development workflow 100 optionally provides framework file 132 to simulator 150 for simulating operation of the reconfigurable processor (e.g., to analyze performance of the core algorithm implementation, to optimize the custom instructions, etc.). Simulator 150 of embodiments may, for example, provide execution of a SystemC model provided by framework file 132 to simulate the operation of a reconfigurable processor with the custom instructions. The input program code, and thus the generated framework executable, may be instrumented to collect performance information (e.g., through inclusion of instrumentation statements), to thereby provide performance results 152. The information provided by performance results 152 provides insight into various aspects of the operation of the reconfigurable processor, such as to indicate which instructions have been executed, which instructions had to be retried because the resources they required were busy at that point in time, queue status/depths for each module, memory bandwidth being used by each module, etc.

Using this instrumented information, embodiments of the invention may iterate back through the custom instruction generation process (e.g., returning to an appropriate one of hybrid threading module 110, timing manager 120, and/or framework generator 130) to modify various parameters. For example, where particular resources were not available for execution of an instruction, embodiments may operate to modify how many instances of a module are actually used. Framework generator 140 may use information specifying that a particular module does not have enough capability by itself to generate two instances of that module, whereby even threads may be sent to one instance of the module and odd threads may be sent to the other instance of the module, for example, such that twice the resources capability to perform those particular custom instructions is provided. Such performance results analysis based modification of the custom instruction set allows the ability to balance the use of resources across all of the modules, which may provide significant gains in performance.

In operation according to the illustrated embodiment, framework file 132 output by framework generator 130 (e.g., after having been optimized or otherwise performance enhanced through simulation and performance analysis) is provided to hardware description language compiler 140 for processing to generate one or more hardware description language file 142a-142c corresponding to the modules of a custom instruction set. Accordingly, hardware description language complier 140 of multistage development workflow 100 of embodiments accepts input of framework file 132 and compiles the program code therein into a hardware description language (e.g., VERILOG HDL) suitable for generating bitstream files used in configuring reconfigurable processors with an instruction set.

Embodiments of multistage development workflow 100 implement one or more flags to facilitate the controlled use of certain features with respect to particular stages of the development of instruction sets. For example, the aforementioned instrumentation statements may be included in the input program code, and thus the custom instructions generated by hybrid threading complier 110 and timing manager 120 and the framework generated by framework generator 130, for use in performance analysis by simulator 150. Similarly, various debug statements may be included in the input program code, and thus the custom instructions generated by hybrid threading complier 110 and timing manager 120 and the framework generated by framework generator 130, for use in debugging operation of the custom instruction set as operable upon simulator 150 or the actual reconfigurable processor. However, such instrumentation and/or debug statements may be unnecessary or undesired in the final instruction set to be loaded on a reconfigurable processor. Accordingly, hardware description language complier 140 of embodiments herein is responsive to one or more flags to control certain features utilized in the development of instruction sets (e.g., a debug flag to implement control inclusion debug instructions in the generated hardware description language files, an instrumentation flag to control inclusion of instrumentation instructions in the generated hardware description language files, etc.). For example, by including the appropriate flag in a pragma of the input program code, the hardware description language instruction set generated by hardware description language compiler 140 may be controlled to include or exclude instructions identified as debug and/or instrumentation instructions. Thus, an instruction set generated by multistage development workflow 100 and loaded on a reconfigurable processor may include or be stripped of such debugging and/or instrumentation instructions, as desired (e.g., depending upon a state of the development of the instruction set, etc.).

As one example of the foregoing use of flags, hardware asserts may be included in the input program code, and thus the custom instructions generated by hybrid threading complier 110 and timing manager 120 and the framework generated by framework generator 130 (as represented in the pseudo code of FIG. 3), for use in debugging the custom instructions. For example, such hardware asserts may be used in the aforementioned simulation to monitor the progress of execution of instructions, to view the state of registers, etc. Such hardware asserts may be useful in a non-final iteration of the generated hardware description language for similar debugging of the actual hardware implementation. However, such hardware asserts may not be desirable in the final custom instruction set, due to their associated FPGA resources and imposed timing constraints. Using the aforementioned flags, such hardware asserts may be automatically eliminated from the custom instruction set as generated by hardware description language compiler 140 to thereby provide a finalized custom instruction set without the need for manually removing the hardware asserts from the input program code.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   parsing, by a compiler, statements of input program code to generate custom instructions for an instruction set loadable upon a reconfigurable processor, wherein a single custom instruction of the instruction set is generated by aggregating the statements of input program code according to one or more constraints that, based upon physical limitations imposed by a framework generator, prevent a terminal conflict resulting from an assumption that, independently of hardware latency requirements of the reconfigurable processor, the single custom instruction may be accomplished in a single clock cycle of the reconfigurable processor;
   analyzing, by the compiler, the statements of input program code to determine capabilities of the reconfigurable processor that are being utilized by the custom instructions, wherein the capabilities of the reconfigurable processor comprise information regarding:
   access capabilities of the custom instructions;
   calling capabilities of the custom instructions; and
   support capabilities of the custom instructions;
   generating, by the compiler, a custom instruction description file including the custom instructions;
   generating, by the compiler, a framework capabilities description file including information regarding the capabilities of the reconfigurable processor that are being utilized by the custom instructions;
   adapting, by a timing manager, the custom instruction description file for hardware timing of the reconfigurable processor, thereby generating a timing adapted custom instruction description file; and adapting, by the timing manager, the framework capabilities description file to include information regarding the adapting of the custom instruction description file, thereby generating a timing adapted framework capabilities description file.

2. The method of claim 1, wherein the input program code comprises program code defining the reconfigurable processor instruction set in a standard programming language.

3. The method of claim 2, wherein the standard programming language comprises a C programming language.

4. The method of claim 1, wherein the constraints include at least one constraint selected from the group consisting of a constraint regarding how many ports are available to access memory, a constraint regarding how many variables may be accessed, a constraint regarding which type of variables may be accessed, a constraint regarding memory access, a constraint regarding arrayed variable access, and a constraint regarding a messaging interface.

5. The method of claim 1, wherein the adapting the custom instruction description file for hardware timing of the reconfigurable processor comprises:

analyzing individual case statements of the custom instructions to determine how many physical clock cycles to spread those instructions over in order to make target hardware timing requirements with respect to the reconfigurable processor.

6. The method of claim 1, wherein the adapting the custom instruction description file for hardware timing of the reconfigurable processor comprises:

inserting staging registers in appropriate positions in the custom instructions in order to make hardware timing requirements with respect to the reconfigurable processor.

7. The method of claim 6, wherein the adapting the framework capabilities description file to include information regarding the adapting of the custom instruction description file comprises adapting the framework capabilities description file to include information regarding the staging registers.

8. The method of claim 1, wherein the adapting the custom instruction description file for hardware timing of the reconfigurable processor comprises:

analyzing the custom instructions of the custom instructions description file to determine hardware timing for the custom instructions based at least in part on the capabilities information of the framework capabilities description file.

9. The method of claim 8, wherein the adapting the custom instruction description file for hardware timing of the reconfigurable processor comprises:

implementing timing constraints, from a timing manager timing constraint set, based upon hardware timing of the reconfigurable processor.

10. The method of claim 9, wherein the timing constraints are based upon physical timing of reconfigurable processor capabilities.

11. The method of claim 10, wherein timing constraint set comprises at least one timing constraint selected from the group consisting of latency for implementing memory access, latency for implementing data output, latency for performing operations, and latency for performing variable access.

12. The method of claim 1, further comprising:

processing, by the framework generator, the custom instructions of the timing adapted custom instruction description file to generate one or more modules comprising routines that call the custom instructions and implement reconfigurable processor capabilities of the timing adapted framework capabilities description file; and generating a framework file, from the routines, comprising an executable description of the instruction set and interfaces to appropriate reconfigurable processor capabilities.

13. The method of claim 12, wherein the executable description comprises an executable model of the reconfigurable processor.

14. The method of claim 13, wherein the executable model comprises a SystemC model of the reconfigurable processor.

15. The method of claim 12, further comprising:

simulating, using the executable description of the framework file, operation of the reconfigurable processor, thereby providing performance results; and optimizing one or more custom instruction of the instruction set using the performance results.

16. The method of claim 12, further comprising:

generating, using the framework file, one or more hardware description language file for loading the instruction set on the reconfigurable processor.

17. The method of claim 16, wherein the generating one or more hardware description language file comprises:

analyzing the framework file for presence of one or more flags to provide at least one of controlled use or inclusion of certain features within the hardware description language file.

18. The method of claim 17, wherein the one or more flags includes at least one flag selected from the group consisting of a debug flag and an instrumentation flag.

19. An apparatus comprising:

one or more computer processors implementing:

a compiler adapted to:

parse statements of input program code to generate custom instructions for an instruction set loadable upon a reconfigurable processor, wherein a single custom instruction of the instruction set is generated by aggregating the statements of input program code according to one or more constraints that, based upon physical limitations imposed by a framework generator, prevent a terminal conflict resulting from an assumption that, independently of hardware latency requirements of the reconfigurable processor, the single custom instruction may be accomplished in a single clock cycle of the reconfigurable processor;

generate a custom instruction description file including the custom instructions;

analyze the statements of the input program code to determine capabilities of the reconfigurable processor that are being utilized by the custom instructions, wherein the capabilities of the reconfigurable processor comprise information regarding:

access capabilities of the custom instructions;
calling capabilities of the custom instructions; and
support capabilities of the custom instructions;

generate a framework capabilities description file including information regarding capabilities of the reconfigurable processor that are being utilized by the custom instructions;

a timing manager configured to:

adapt the custom instruction description file for hardware timing of the reconfigurable processor, thereby generating a timing adapted custom instruction description file; and adapt the framework capabilities description file to include information regarding the adapting of the custom instruction description file, thereby generating a timing adapted framework capabilities description file; and at least one memory coupled to the one or more computer processors.

20. The apparatus of claim 19, wherein the one or more constraints include at least one constraint selected from the group consisting of a constraint regarding how many ports are available to access memory, a constraint regarding how many variables may be accessed, a constraint regarding which type of variables may be accessed, a constraint regarding memory access, a constraint regarding arrayed variable access, and a constraint regarding a messaging interface.

21. The apparatus of claim 19, wherein the timing adapted custom instruction description file includes staging registers inserted in appropriate positions in the custom instructions in order to make hardware timing requirements with respect to the reconfigurable processor.

22. The apparatus of claim 21, wherein the timing adapted framework capabilities description file includes information regarding the staging registers.

23. The apparatus of claim 19, wherein the one or more computer processors further implement:

a timing constraint set including information regarding hardware timing of the reconfigurable processor.

24. The apparatus of claim 23, wherein the timing constraints are based upon physical timing of reconfigurable processor capabilities.

25. The apparatus of claim 24, wherein the timing constraint set comprises at least one timing constraint selected from the group consisting of latency for implementing memory access, latency for implementing data output, latency for performing operations, and latency for performing variable access.

26. The apparatus of claim 19, wherein the one or more computer processors further implement:

the framework generator, wherein the framework generator is adapted to generate a framework file comprising an executable description of the instruction set using the custom instructions of the timing adapted custom instruction description file and the information regarding capabilities of the reconfigurable processor of the timing adapted framework capabilities description file.

27. The apparatus of claim 26, wherein the one or more computer processors further implement:

a simulator adapted to simulate operation of the reconfigurable processor using the executable description of the instruction set of the framework file.

28. The apparatus of claim 26, wherein the one or more computer processors further implement:

a hardware description language compiler adapted to generate, using the framework file, one or more hardware description language file for loading the instruction set on the reconfigurable processor.

29. The method of claim 1, wherein the information regarding the capabilities of the reconfigurable processor that are being utilized by the custom instructions includes at least one of:

variable type;

external module identification;

port identification;

support for modules with multi-threaded execution with custom instructions;

support for at least one of C style typedefs, structures, or unions;

support for at least one of thread private, thread shared, global variables, or pipeline staging variables;

support for custom instruction memory read and write operations; or support for modules to interact including at least one of remote module thread creation, message passing, or global variable access.

30. The method of claim 29, wherein the custom instructions include individual case entries within switch statements.

* * * * *